United States Patent
Tripathi et al.

(10) Patent No.: US 11,950,147 B2
(45) Date of Patent: Apr. 2, 2024

(54) SMART NON-STAND ALONE (NSA) OPERATION BETWEEN MM-WAVE AND SUB6

(71) Applicant: RAKUTEN MOBILE, INC., Tokyo (JP)

(72) Inventors: Sandeep Mani Tripathi, Tokyo (JP); Vaibhav Pradhan, Tokyo (JP); Krishnan Venkataraghavan, Tokyo (JP)

(73) Assignee: RAKUTEN MOBILE, INC., Tokyo (JP)

(*) Notice: Subject to any disclaimer, the term of this patent is extended or adjusted under 35 U.S.C. 154(b) by 264 days.

(21) Appl. No.: 17/502,125

(22) Filed: Oct. 15, 2021

(65) Prior Publication Data

US 2023/0122054 A1 Apr. 20, 2023

(51) Int. Cl.
*H04W 36/00* (2009.01)

(52) U.S. Cl.
CPC . *H04W 36/0069* (2018.08); *H04W 36/00837* (2018.08)

(58) Field of Classification Search
CPC ..... H04W 36/14; H04W 76/27; H04W 76/19; H04W 76/10; H04W 36/08; H04W 36/0085; H04W 36/00; H04W 28/0231; H04W 36/00837; H04W 36/0069
See application file for complete search history.

(56) References Cited

U.S. PATENT DOCUMENTS

| | | | |
|---|---|---|---|
| 2019/0357199 A1* | 11/2019 | Ali | H04L 5/001 |
| 2020/0252849 A1* | 8/2020 | Tang | H04W 36/08 |
| 2020/0267605 A1* | 8/2020 | Bae | H04W 36/0022 |
| 2020/0267618 A1* | 8/2020 | Kye | H04W 76/15 |
| 2020/0336979 A1* | 10/2020 | Aoyagi | H04L 65/1069 |
| 2021/0058838 A1* | 2/2021 | Lee | H04W 36/0058 |
| 2021/0136645 A1* | 5/2021 | Zhao | H04W 36/30 |
| 2021/0195439 A1* | 6/2021 | Prabhakar | H04W 52/28 |
| 2021/0250745 A1* | 8/2021 | Thanneeru | H04W 4/90 |
| 2021/0251029 A1* | 8/2021 | Sanders | H04W 36/00692 |
| 2022/0167226 A1* | 5/2022 | Chin | H04W 36/0022 |
| 2023/0083339 A1* | 3/2023 | Nagarajan | H04W 48/20 455/434 |
| 2023/0180072 A1* | 6/2023 | Ranjan | H04W 48/18 455/436 |

OTHER PUBLICATIONS

International Search Report dated May 11, 2022 from the International Searching Authority in International Application No. PCT/US2022/016069.
Written Opinion dated May 11, 2022 from the International Searching Authority in International Application No. PCT/US2022/016069.

* cited by examiner

*Primary Examiner* — Dung Hong (74) *Attorney, Agent, or Firm* — Sughrue Mion, PLLC (57) ABSTRACT

A method is provided. The method includes determining, while a user equipment (UE) is connected to a long term evolution (LTE) cell, that the UE supports connection with a first fifth generation (5G) frequency range (FR1) base station (gNB) and a second 5G frequency range (FR2) base station (SgNB), when the UE is camped to an FR1 cell, determining whether at least one connection condition is satisfied, and controlling to release the UE from the FR1 cell and initiating the UE to an FR2 cell when the at least one connection condition is determined to be satisfied.

17 Claims, 9 Drawing Sheets

SMART NON-STAND ALONE (NSA) OPERATION BETWEEN MM-WAVE AND SUB6

BACKGROUND

1. Field

The disclosure relates to a system and method for providing connection of a user equipment (UE) to other frequency ranges in a 5th Generation (5G) environment.

2. Description of Related Art

A network environment may include a long term evolution (LTE) base station (eNB), a first 5G frequency range (FR1) base station (gNB) and a second 5G frequency range (FR2) base station (SgNB). In a non-stand alone (NSA) operation, once a UE is latched to a gNB cell, the UE or the network may not support FR1 to FR2 switching mobility. In such a scenario, the UE may not measure the FR2 and the only way for the UE to camp to an FR2 cell is releasing the UE from an FR1 cell through a failure operation (i.e., at a new radio (NR) release threshold). This causes low FR2 utilization despite the higher available bandwidth.

SUMMARY

According to an aspect of the disclosure, a method may include determining, while a user equipment (UE) is connected to a long term evolution (LTE) cell, that the UE supports connection with a first fifth generation (5G) frequency range (FR1) base station (gNB) and a second 5G frequency range (FR2) base station (SgNB), when the UE is camped to an FR1 cell, determining whether at least one connection condition is satisfied, and controlling to release the UE from the FR1 cell and initiating the UE to an FR2 cell when the at least one connection condition is determined to be satisfied.

According to an aspect of the disclosure, a system for determining a connection to a wireless communication cell may include a memory configured to store instructions and one or more processors configured to execute the instructions to determine, while a UE is connected to a LTE cell, that the UE supports connections with a first 5G FR1 gNB and a second 5G FR2 SgNB, when the UE is camped to an FR1 cell, determine whether at least one connection condition is satisfied, and control to release the UE from the FR1 cell and initiate the UE to an FR2 cell when the at least one connection condition is determined to be satisfied.

According to an aspect of the disclosure, a non-transitory computer-readable medium may store instructions including one or more instructions that, when executed by one or more processors of a wireless communication system, cause the one or more processors to determine, while a UE is connected to a LTE cell, that the UE supports connections with a first 5G FR1 gNB and a second 5G FR2 SgNB, when the UE is camped to an FR1 cell, determine whether at least one connection condition satisfied, and control to release the UE from the FR1 cell and initiate the UE to an FR2 cell when the at least one connection condition is determined to be satisfied.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Example embodiments of the present disclosure are directed to improved utilization of FR1 gNBs and FR2 SgNBs. When a UE enters a network environment, the UE may connect to an LTE cell. As the UE moves further within the environment, the UE may be in range of a 5G FR1 gNB that is collocated with the LTE eNB and may connect with an FR1 cell. As the UE moves even further within the environment, the UE may be in range of a 5G FR2 SgNB that is collocated with the LTE eNB and the FR1 gNB. Instead of initiating a failure state to disconnect from the FR1 cell to connect to an FR2 cell, the UE, the base stations, or a server associated with the network environment, may determine whether a connection condition is satisfied while the UE is camped on the FR1 cell. If the connection condition is satisfied, the UE may release from the FR1 cell and initiate connected to the FR2 cell.

Figure 1:
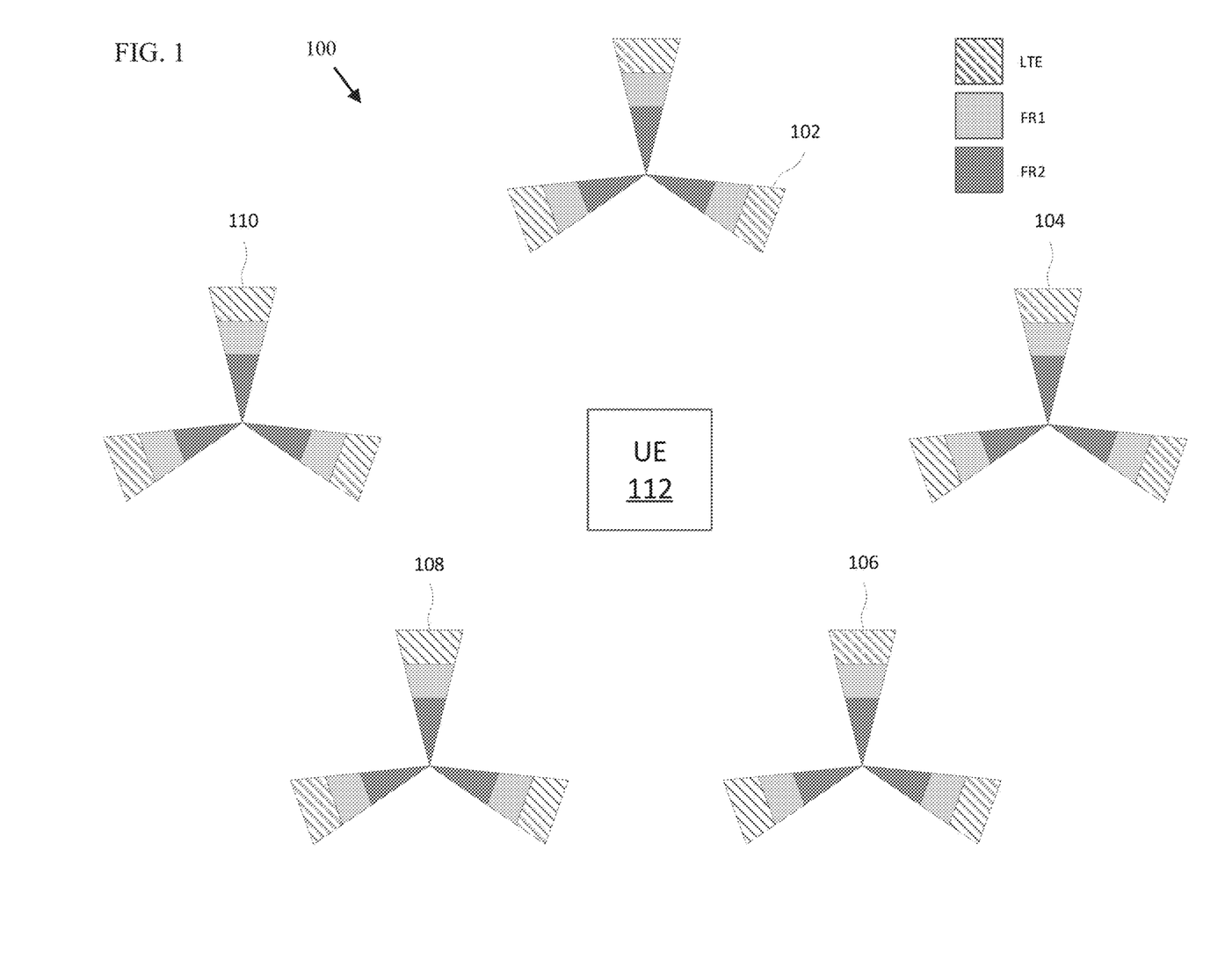
FIG. 1 is a diagram of an overall network environment, according to an embodiment.

FIG. 1 is a diagram of an overall network environment 100 according to an embodiment. The network environment 100 may include multiple networks 102-110. Each network may include an LTE eNB, an FR1 gNB and an FR2 SgNB, with the eNB having the widest range and the SgNB having the shortest range. A UE 112 may enter any of the networks 102-110.

Figure 2:
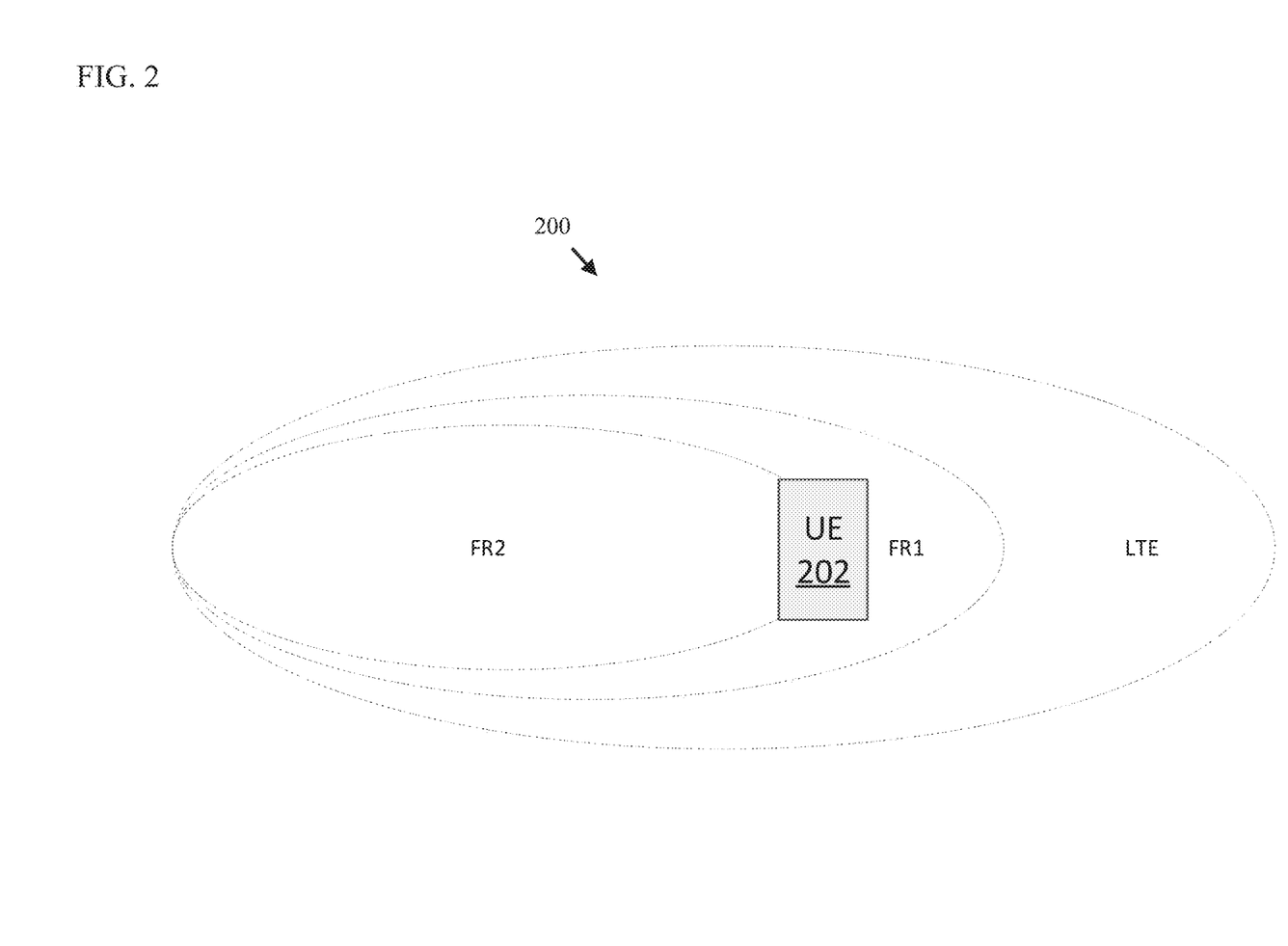
FIG. 2 is a diagram of a network, according to an embodiment.

FIG. 2 is a diagram of a network 200, according to an embodiment. The network 200 includes an LTE range, an FR1 and FR2. As the UE 202 moves through the network, the UE 202 may connect to an FR1 cell. Once the UE 202 is within range of the FR2, the UE 202, a server or other device may determine whether a connection condition is satisfied while the UE 202 remains connected to the FR1 cell. If the connection condition is satisfied, the UE 202 may release from the FR1 cell and initiate to an FR2 cell, as is described in detail below.

Figure 3:
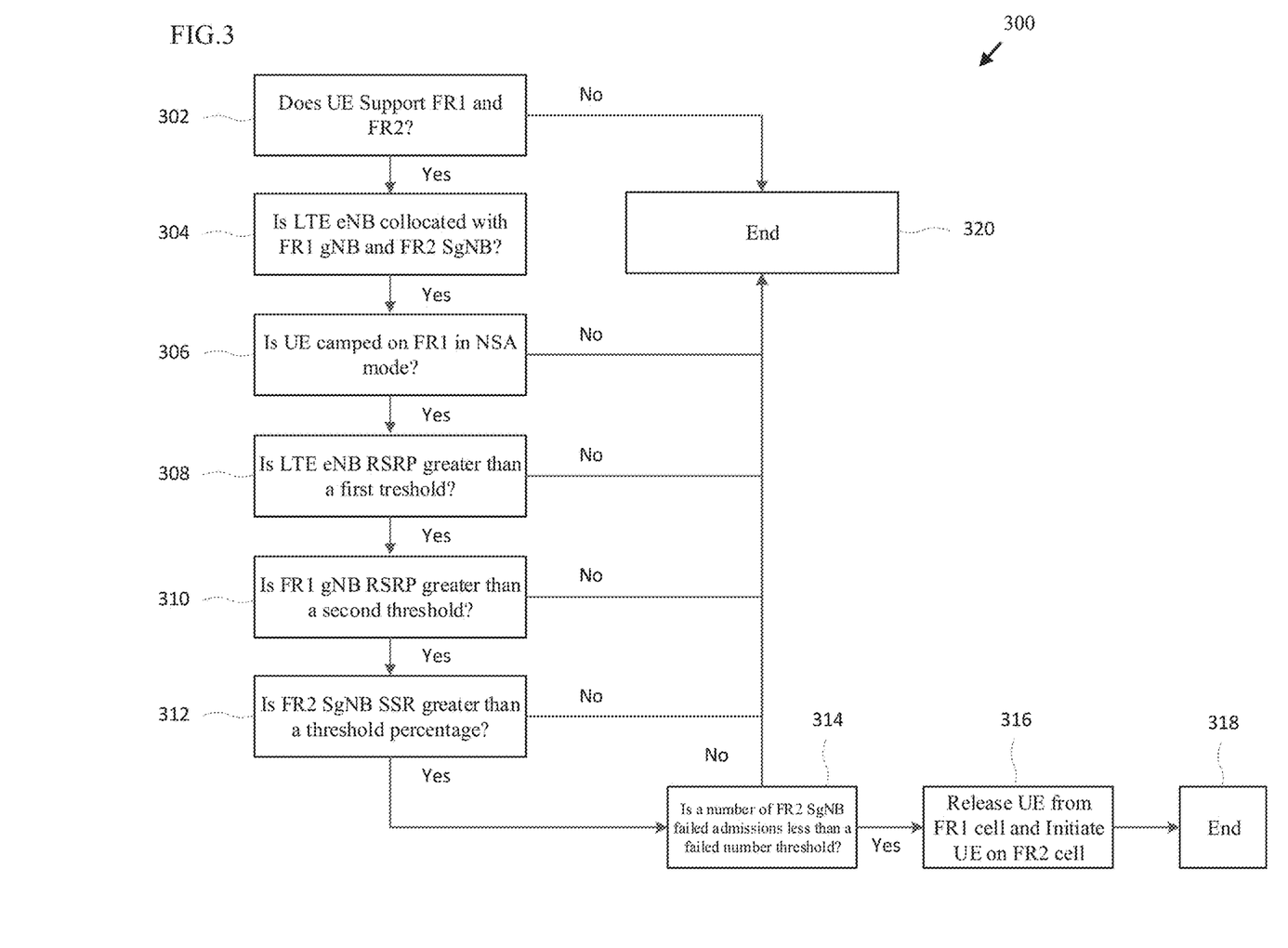
FIG. 3 is a flowchart of a method for switching a UE from an FR1 cell to an FR2 cell, according to an embodiment.

FIG. 3 is a flowchart 300 of a method for switching a UE from an FR1 cell to an FR2 cell, according to an embodiment. The operations depicted in FIG. 3 may be performed by the base stations, the UE, and/or a backed server, and the operations are described as being performed by a system for ease of description. If the result of operations 302-314 are "no" then the method ends in operation 320. In operation 302, the system determines whether the UE supports connection with the FR1 and FR2. When the UE supports connection FR1 and FR2, in operation 304, the system determines whether the eNB is collocated with the FR1 gNB and the FR2 gNB. When the eNB is collocated with the FR1 gNB and the FR2 gNB, in operation 306, the system determines whether the UE is camped on an FR1 cell in NSA mode.

When the UE is camped on an FR1 cell in NSA mode, in operation 308, the system determines whether the LTE eNB reference signal received power (RSRP) is greater than a first RSRP threshold TH1. When the LTE eNB RSRP is greater than the first RSRP threshold TH1, in operation 310, the system determines whether the FR1 gNB RSRP is greater than a second RSRP threshold TH2. The first and second RSRP thresholds, TH1 and TH2, may be stored on a centralized server, and the LTE eNB RSRP and the FR1 gNB RSRP may be determined based on a UE measurement. When the FR1 gNB RSRP is greater than the second RSRP threshold TH2, in operation 312, the system determines whether the FR2 SgNB signal success rate (SSR) is greater than a threshold success percentage X. The SSR may be based a number of successful additions of UEs to the FR2, and the threshold success percentage X may be stored on a centralized server.

When the FR2 SgNB SSR is greater than the threshold success percentage X, in operation 314, the system determines whether a number of FR2 SgNB failed admissions is less than a failed number of admissions threshold Y. The number of failed admissions may refer to a number of times a UE attempts to connect to an FR2 cell and fails, and the failed number of admissions threshold may be stored on a centralized server. When the number of FR2 SgNB failed admissions is less than the failed number of admissions threshold Y, in operation 316, the system controls the UE to release from the FR1 cell and initiates the UE on an FR2 cell. In operation 318, the method ends.

Figure 4:
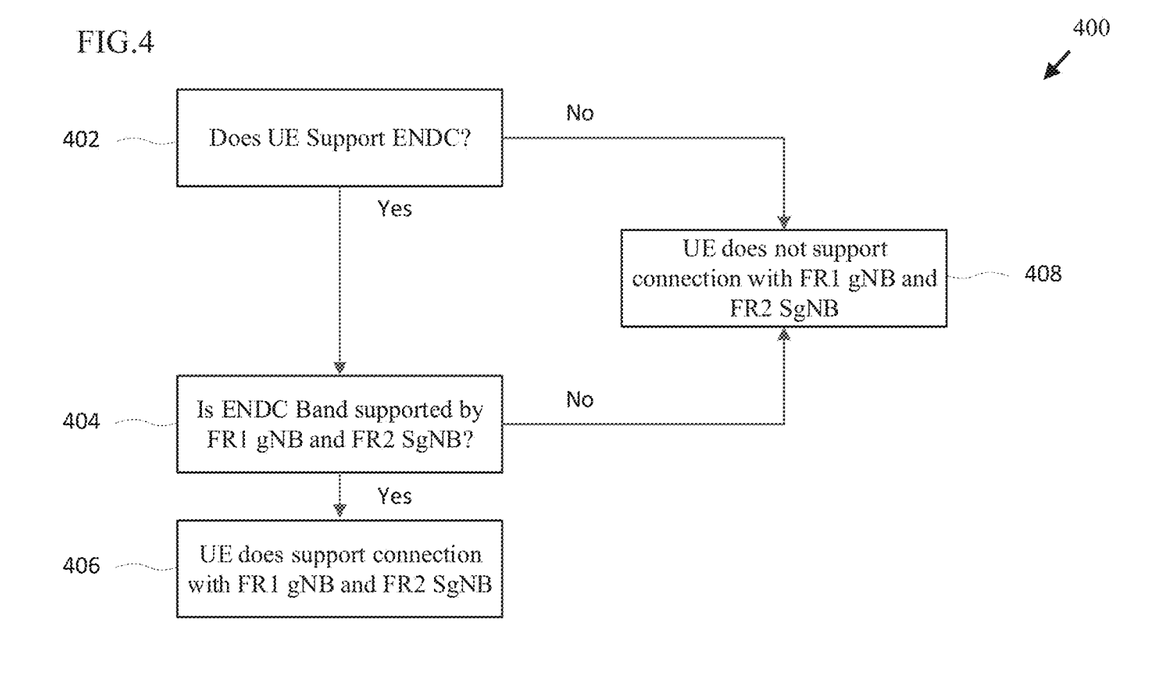
FIG. 4 is a flowchart of a method of operation 302 of FIG. 3, according to an embodiment.

FIG. 4 is a flowchart 400 of a method of operation 302 of FIG. 3, according to an embodiment. The operations depicted in FIG. 4 may be performed by the base stations, the UE, and/or a backed server, and the operations are described as being performed by a system for ease of description. In operation 402, the system determines whether the UE supports evolved universal terrestrial radio access (E-UTRA) new radio (NR) dual connectivity (ENDO). If no, in operation 408, the system determines that the UE does not support connection with the FR1 gNB and the FR2 SgNB. If yes, in operation 404, the system determines whether the ENDO band is supported by the FR1 gNB and the FR2 SgNB. In no, in operation 408, the system determines that the UE does not support connection with the FR1 gNB and the FR2 SgNB, If yes, in operation 406, the system determines that the UE supports connection with the FR1 gNB and the FR2 SgNB.

Figure 5:
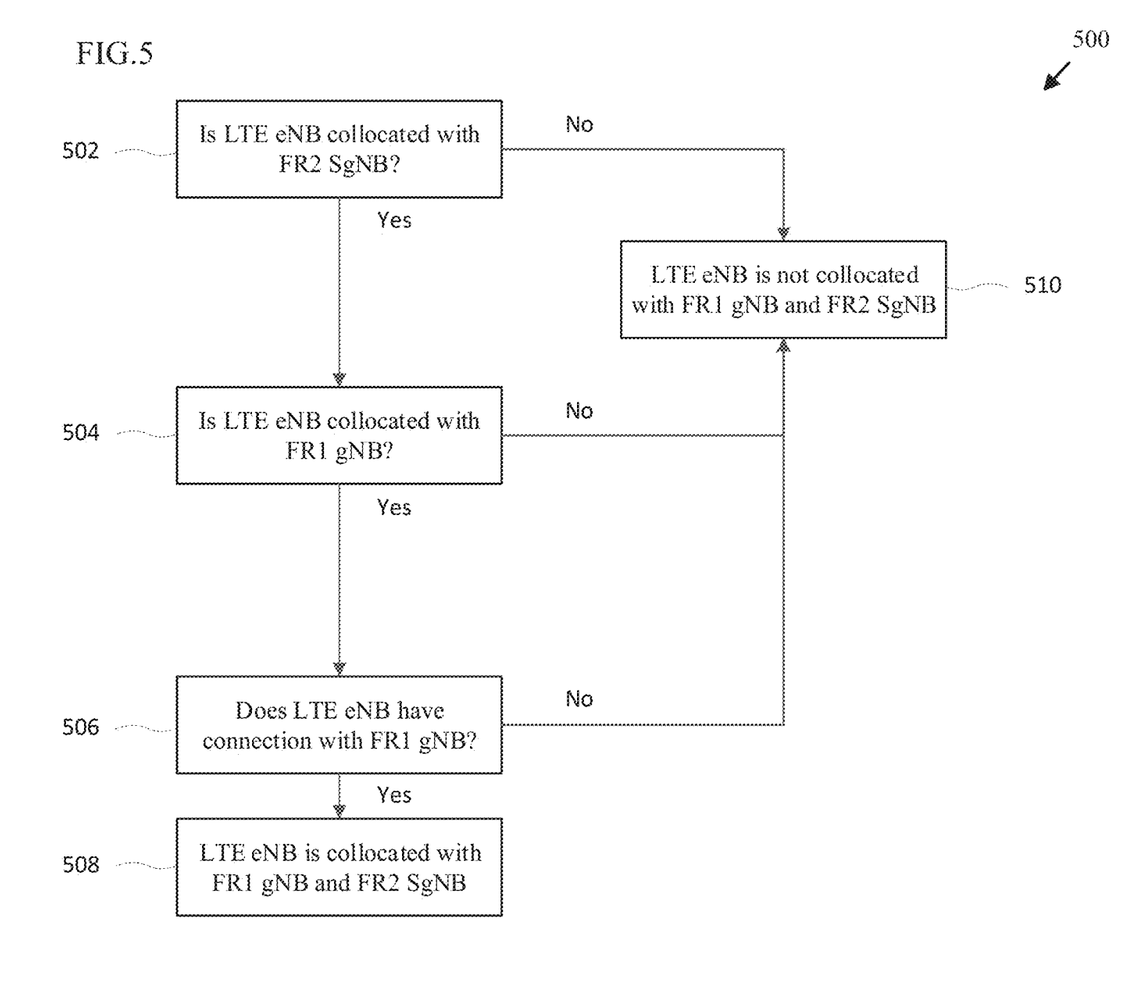
FIG. 5 is a flowchart of a method of operation 304 of FIG. 3, according to an embodiment.

FIG. 5 is a flowchart 500 of a method of operation 304 of FIG. 3 according to an embodiment. The operations depicted in FIG. 5 may be performed by the base stations, the UE, and/or a backed server, and the operations are described as being performed by a system for ease of description. If the result of operations 502-506 are "no", then the system determines that the LTE eNB is not collocated with the FR1 gNB and the FR2 SgNB. In operation 502, the system determines whether the LTE eNB is collocated with the FR2 SgNB. When the LTE eNB is collocated with the FR2 SgNB, in operation 504, the system determines whether the LTE eNB is collocated with the FR1 gNB. When the LTE eNB is collocated with the FR1 gNB, in operation 506, the system determines whether the LTE eNB has connection with the FR1 gNB. When the LTE eNB has connection with the FR1 gNB, in operation 508, the system determines that the LTE eNB is collocated with the FR1 gNB and the FR2 gNB.

Each of the operations described in FIGS. 3, 4 and 5 may be considered connection conditions as will be understood by one of skill in the art from the disclosure herein.

The threshold success percentage X and the faded number of admissions threshold Y may be fixed by user input or by system parameters. The first and second RSRP thresholds, TH1 and TH2 respectively, may be initially defined by a user or by system parameters, and may be adapted by an ML algorithm.

Figure 6:
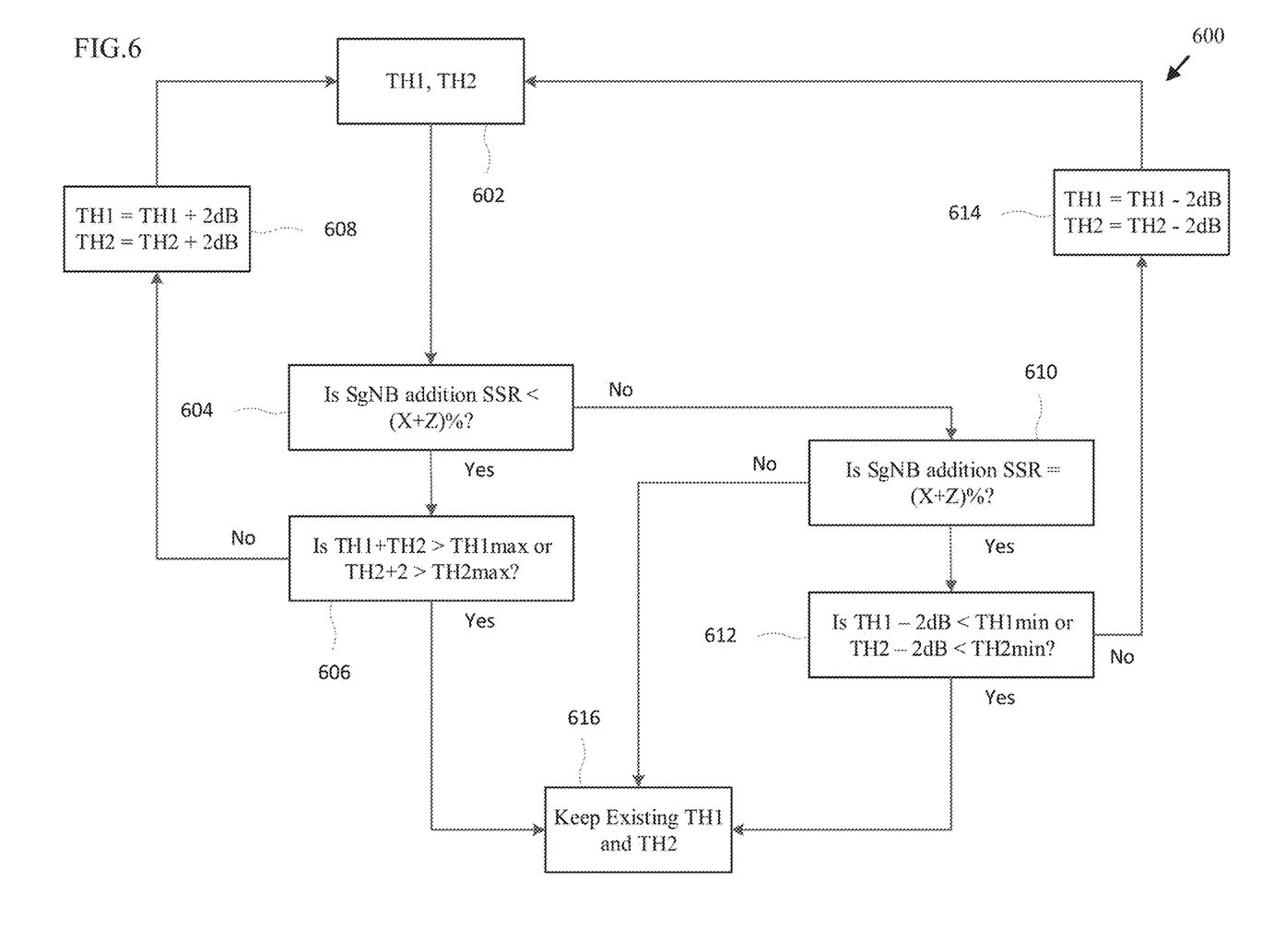
FIG. 6 is a flowchart of a machine learning (ML) algorithm, according to an embodiment.

FIG. 6 is a flowchart of an ML algorithm, according to an embodiment. In operation 602, the values of TH1 and TH2 are initialized. The values of TH1 and TH2 may be initialized by a UE or network system. The values of TH1 and TH2 in operation 602 may be updated values based on a previous iteration of the ML algorithm. In operation 604, the system determines whether the SgNB SSR is less than a modified percentage determined by the threshold success percentage X plus a user input value Z (i.e., X+Z). When the system determines the SgNB SSR is less than the modified percentage, then, in operation 606, the system determines whether TH1+TH2 is greater than a TH1 maximum threshold TH1 max or whether TH2+2 is greater than a TH2 maximum threshold TH2 max. When the system determines that TH1+TH2 is greater than TH1 max or that TH2+2 is greater than TH2 max, then, in operation 608, the system increases the value of TH1 by 2 dB and the value of TH2 by 2 dB. When the system determines that TH1+TH2 is not greater than TH1 max or that TH2+2 is not greater than TH2 max, then, in operation 616, the system keeps the existing TH1 and TH2 values.

When, in operation 604, the system determines the SgNB SSR is not less than the modified percentage, then, in operation 610, the system determines whether the SgNB SSR is equal to the modified percentage. When the system determines that the SgNB SSR is not equal to the modified percentage, in operation 616, the system keeps the existing values for TH1 and TH2. When the system determines that the SgNB SSR is equal to the modified percentage, then, in operation 612, the system determines whether TH1−2 dB is less than a minimum TH1 threshold TH1 min or whether TH2−2 dB is less than a minimum TH2 threshold TH2 min. When the system determines that TH1−2 dB is less than TH1 min or that TH2−2 dB is less than TH2 min, then in operation 616, the system keeps the existing values of TH1 and TH2. When the system determines that TH1−2 dB is not less than TH1 min or that TH2−2 dB is not less than TH2 min, then in operation 614, the system decreases the value of TH1 by 2 dB and the value of TH2 by 2 dB.

Figure 7:
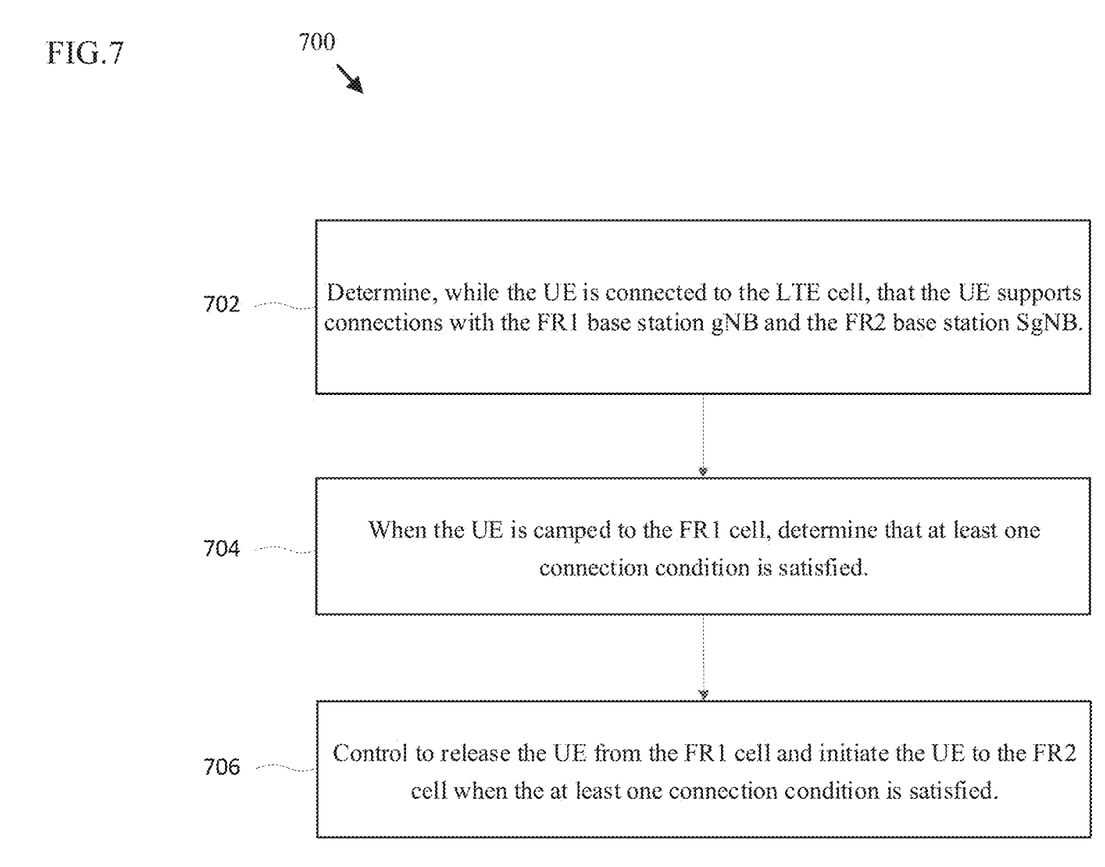
FIG. 7 is a flowchart for a method of connecting a UE to an FR2 cell, according to an embodiment.

FIG. 7 is a flowchart for a method of connecting a UE to an FR2 cell, according to an embodiment. In operation 702, the system determines, while a UE is connected to an LTE cell, that the UE supports connection with a FR1 gNB and an FR2 SgNB. In operation 704, when the UE is camped to an FR1 cell, the system determines whether at least one connection condition is satisfied. In operation 706, the system controls to release the UE from the FR1 cell and initiate the UE to an FR2 cell when the at least one connection condition is determined to be satisfied.

Figure 8:
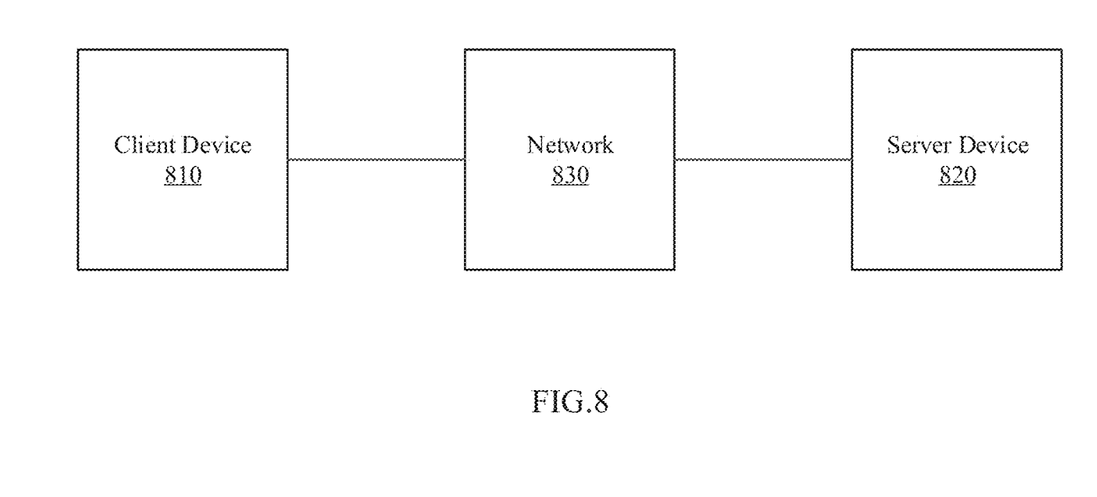
FIG. 8 is a diagram of devices for a network environment, according to an embodiment.

FIG. 8 is a diagram of devices for a network environment, according to an embodiment. FIG. 8 includes a client device 810, a server device 820, and a network 830. The client device 810 and the server device 820 may interconnect via wired connections, wireless connections, or a combination of wired and wireless connections.

The client device 810 may include one or more devices. For example, the client device 810 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device.

The server device 820 may include one or more devices. For example, the server device 820 may be a server device, a computing device, or the like.

The network 830 includes one or more wired and/or wireless networks. For example, network 830 may include a cellular network (e.g., a 5G network, a LTE network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) may perform one or more functions described as being performed by another set of devices.

Figure 9:
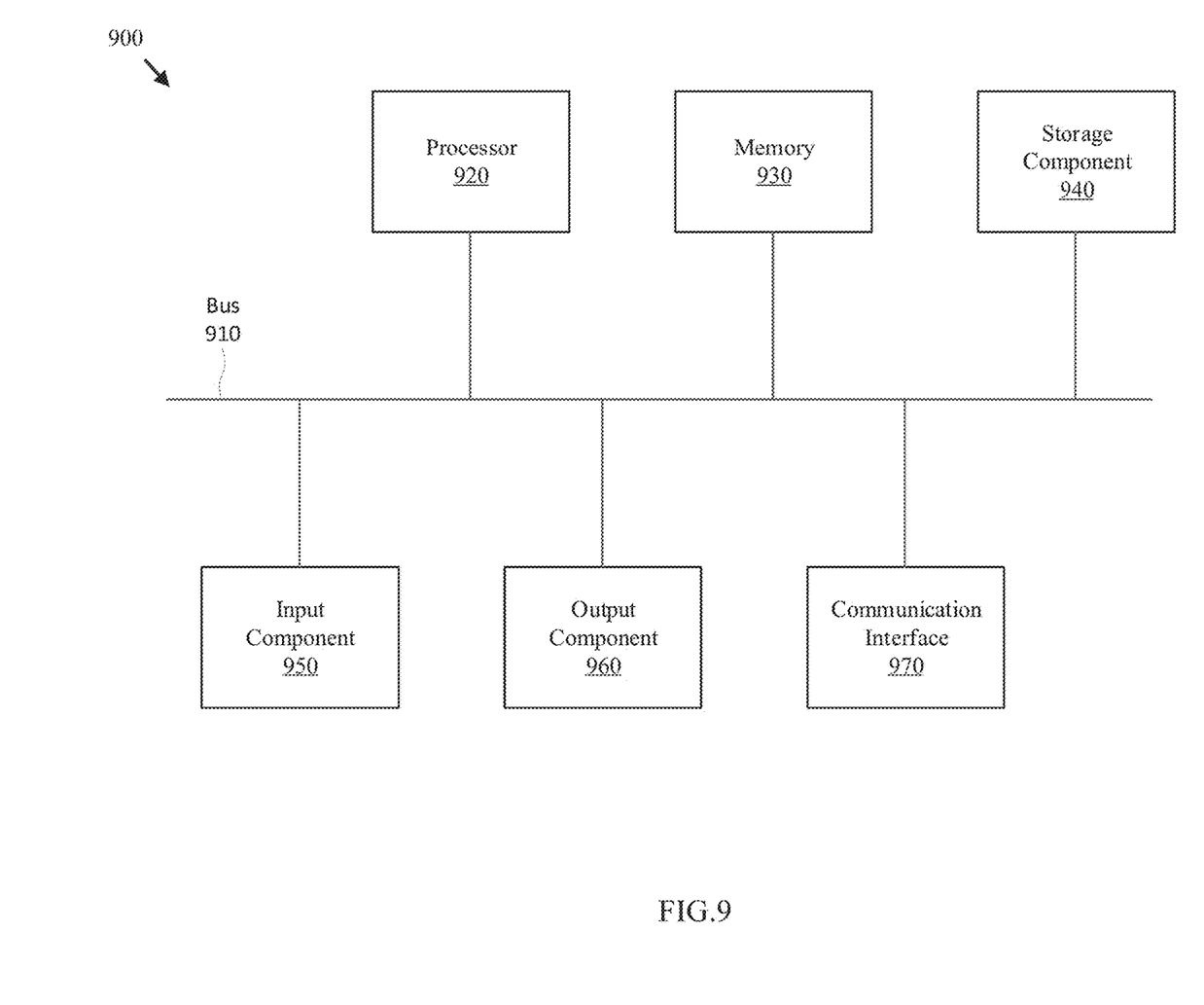
FIG. 9 is a diagram of components of one or more devices of FIG. 8, according to an embodiment.

FIG. 9 is a diagram of components of one or more devices of FIG. 8 according to an embodiment. Device 900 may correspond to the client device 810 and/or the server device 820.

As shown in FIG. 9, the device 900 may include a bus 910, a processor 920, a memory 930, a storage component 940, an input component 950, an output component 960, and a communication interface 970.

The bus 910 includes a component that permits communication among the components of the device 900. The processor 920 is implemented in hardware, firmware, or a combination of hardware and software. The processor 920 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 920 includes one or more processors capable of being programmed to perform a function.

The memory 930 includes a random access memory (RAM), a read only memory (ROM), and/or another type of dynamic or static storage device (e.g., a flash memory, a magnetic memory, and/or an optical memory) that stores information and/or instructions for use by the processor 920.

The storage component 940 stores information and/or software related to the operation and use of the device 900. For example, the storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 950 includes a component that permits the device 900 to receive information, such as via user input (e.g., a touch screen display, a keyboard, a keypad, a mouse, a button, a switch, and/or a microphone). The input component 950 may include a sensor for sensing information (e.g., a global positioning system (GPS) component, an accelerometer, a gyroscope, and/or an actuator).

The output component 960 includes a component that provides output information from the device 900 (e.g., a display, a speaker, and/or one or more light-emitting diodes (LEDs)).

The communication interface 970 includes a transceiver-like component (e.g., a transceiver and/or a separate receiver and transmitter) that enables the device 900 to communicate with other devices, such as via a wired connection, a wireless connection, or a combination of wired and wireless connections. The communication interface 970 may permit device 900 to receive information from another device and/or provide information to another device. For example, the communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

The device 900 may perform one or more processes described herein. The device 900 may perform operations based on the processor 920 executing software instructions stored by a non-transitory computer-readable medium, such as the memory 930 and/or the storage component 940. A computer-readable medium is defined herein as a non-transitory memory device. A memory device includes memory space within a single physical storage device or memory space spread across multiple physical storage devices.

Software instructions may be read into the memory 930 and/or the storage component 940 from another computer-readable medium or from another device via the communication interface 970. When executed, software instructions stored in the memory 930 and/or storage component 940 may cause the processor 920 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more," Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

What is claimed is:

1. A method, comprising:
    determining, while a user equipment (UE) is connected to a long term evolution (LTE) cell, that the UE supports connection with a first fifth generation (5G) frequency range (FR1) base station (gNB) and a second 5G frequency range (FR2) base station (SgNB);
    when the UE is camped to an FR1 cell, determining whether at least one connection condition is satisfied, the at least one connection condition comprising an addition signal success rate (SSR) of the FR2 SgNB exceeding a threshold percentage and a number of FR2 SgNB failed additions within a current session being less than a threshold number of failed additions, the addition SSR corresponding to a number of successful additions of UEs to the FR2; and
    controlling to release the UE from the FR1 cell and initiating the UE to an FR2 cell when the at least one connection condition is determined to be satisfied.

2. The method of claim 1, further comprising:
    determining that an LTE base station (eNB) is collocated with the FR1 gNB and the FR2 SgNB when it is determined that the UE supports connection with the FR1 gNB and the FR2 SgNB.

3. The method of claim 2, wherein determining that the LTE eNB is collocated with the FR1 gNB and the FR2 SgNB further comprises:
    determining that the LTE eNB is collocated with the FR2 SgNB;
    determining that the LTE eNB is collocated with the FR1 gNB when the LTE eNB is collocated with the FR2 SgNB; and
    determining that the UE is in connection with the FR1 cell and an LTE cell where the LTE eNB, the FR1 gNB, and the FR2 SgNB are collocated.

4. The method of claim 1, wherein determining that the UE supports connection with the FR1 gNB and the FR2 SgNB further comprises:
    determining that the UE supports evolved universal terrestrial radio access (E-UTRA) new radio (NR) dual connectivity (ENDC); and
    determining that the UE supports an ENDC band with the FR1 gNB and the FR2 SgNB.

5. The method of claim 1, wherein the at least one connection condition comprises a reference signal received power (RSRP) of the LTE eNB exceeding a first threshold and an RSRP of the FR1 gNB exceeding a second threshold.

6. The method of claim 5, wherein the first threshold and second threshold are initially set by a user of the UE; and the method further comprising:
    adjusting the first threshold and the second threshold according to a machine learning (ML) algorithm.

7. A system for determining a connection to a wireless communication cell, the system comprising:
    a memory configured to store instructions; and
    one or more processors configured to execute the instructions to:
    determine, while a user equipment (UE) is connected to a long term evolution (LTE) cell, that the UE supports connections with a first fifth generation (5G) frequency range (FR1) base station (gNB) and a second 5G frequency range (FR2) base station (SgNB);
    when the UE is camped to an FR1 cell, determine whether at least one connection condition is satisfied, the at least one connection condition comprising an addition signal success rate (SSR) of the FR2 SgNB exceeding a threshold percentage and a number of FR2 SgNB failed additions within a current session being less than a threshold number of failed additions, the addition SSR corresponding to a number of successful additions of UEs to the FR2; and
    control to release the UE from the FR1 cell and initiate the UE to an FR2 cell when the at least one connection condition is determined to be satisfied.

8. The system of claim 7, wherein the one or more processors is further configured to execute the instructions to:
    determine that an LTE base station (eNB) is collocated with the FR1 gNB and the FR2 SgNB when it is determined that the UE supports connection with the FR1 gNB and the FR2 SgNB.

9. The system of claim 8, wherein the one or more processors is further configured to execute the instructions to:
    determine that the LTE eNB is collocated with the FR2 SgNB;
    determine that the LTE eNB is collocated with the FR1 gNB when the LTE eNB is collocated with the FR2 SgNB; and
    determine that the UE is in connection with the FR1 cell and an LTE cell where the LTE eNB, the FR1 gNB, and the FR2 SgNB are collocated.

10. The system of claim 7, wherein the one or more processors is further configured to execute the instructions to:

determine that the UE supports evolved universal terrestrial radio access (E-UTRA) new radio (NR) dual connectivity (ENDC); and determine that the UE supports an ENDC band with the FR1 gNB and the FR2 SgNB.

11. The system of claim 7, wherein the at least one connection condition comprises a reference signal received power (RSRP) of the LTE eNB exceeding a first threshold and an RSRP of the FR1 gNB exceeding a second threshold.

12. The system of claim 11, wherein the first threshold and second threshold are initially set by a user of the UE; and wherein the one or more processors is further configured to execute the instructions to adjust the first threshold and the second threshold according to a machine learning (ML) algorithm.

13. A non-transitory computer-readable medium storing instructions, the instructions comprising: one or more instructions that, when executed by one or more processors of a wireless communication system, cause the one or more processors to:

determine, while a user equipment (UE) is connected to a long term evolution (LTE) cell, that the UE supports connection with a first fifth generation (5G) frequency range (FR1) base station (gNB) and a second 5G frequency range (FR2) base station (SgNB);

when the UE is camped to an FR1 cell, determine that at least one connection condition is satisfied, the at least one connection condition comprising an addition signal success rate (SSR) of the FR2 SgNB exceeding a threshold percentage and a number of FR2 SgNB failed additions within a current session being less than a threshold number of failed additions, the addition SSR corresponding to a number of successful additions of UEs to the FR2; and control to release the UE from the FR1 cell and initiate the UE to an FR2 cell when the at least one connection condition is satisfied.

14. The non-transitory computer-readable medium of claim 13, wherein the one or more instructions further cause the one or more processors to:

determine that an LTE base station (eNB) is collocated with the FR1 gNB and the FR2 SgNB when it is determined that the UE supports connection with the FR1 gNB and the FR2 SgNB.

15. The non-transitory computer-readable medium of claim 14, wherein the one or more instructions further cause the one or more processors to:

determine that the LTE eNB is collocated with the FR2 SgNB;

determine that the LTE eNB is collocated with the FR1 gNB when the LTE eNB is collocated with the FR2 SgNB; and determine that the UE is in connection with the FR1 cell and an LTE cell where the LTE eNB, the FR1 gNB, and the FR2 SgNB are collocated.

16. The non-transitory computer-readable medium of claim 13, wherein the one or more instructions further cause the one or more processors to:

determine that the UE supports evolved universal terrestrial radio access (E-UTRA) new radio (NR) dual connectivity (ENDC); and determine that the UE supports an ENDC band with the FR1 gNB and the FR2 SgNB.

17. The non-transitory computer-readable medium of claim 13, wherein the at least one connection condition comprises a reference signal received power (RSRP) of the LTE eNB exceeding a first threshold and an RSRP of the FR1 gNB exceeding a second threshold.

* * * * *